(12) United States Patent
    White

(10) Patent No.: US 7,784,802 B2
(45) Date of Patent: Aug. 31, 2010

(54) DOOR CARRIER AND MOUNTING DEVICE

(75) Inventor: Daniel Mark White, 16656 Meadow Oaks Dr., Sonoma, CA (US) 95476

(73) Assignee: Daniel Mark White, Sonoma, CA (US)

( * ) Notice: Subject to any disclaimer, the term of this patent is extended or adjusted under 35 U.S.C. 154(b) by 311 days.

(21) Appl. No.: 11/872,888

(22) Filed: Oct. 16, 2007

(65) Prior Publication Data
    US 2009/0096144 A1    Apr. 16, 2009

(51) Int. Cl.
    *B62B 3/04*    (2006.01)
    *B62B 3/10*    (2006.01)
(52) U.S. Cl. ................. 280/79.11; 280/79.7; 280/47.41
(58) Field of Classification Search ............. 280/47.17, 280/47.18, 47.27–47.29, 47.34, 47.35, 47.41, 280/79.11, 79.2, 79.3, 79.7; 254/2 R, 7 R, 254/7 C
    See application file for complete search history.

(56) References Cited

U.S. PATENT DOCUMENTS

| 2,291,474 | A | | 7/1942 | Kalmbach | |
|---|---|---|---|---|---|
| 2,503,388 | A | * | 4/1950 | Hedlund | 414/10 |
| 2,967,627 | A | * | 1/1961 | Vinson | 254/2 R |
| 3,643,935 | A | | 2/1972 | Bell | |
| 4,050,671 | A | * | 9/1977 | Coleman | 254/7 R |
| 4,176,831 | A | | 12/1979 | Adams | |
| 4,278,244 | A | * | 7/1981 | Carter | 269/17 |
| 4,491,452 | A | * | 1/1985 | Matovich | 414/427 |
| 4,492,369 | A | | 1/1985 | Pohl | |
| 4,695,067 | A | | 9/1987 | Willey | |
| 4,810,151 | A | | 3/1989 | Shern | |
| D310,894 | S | | 9/1990 | Smith | |
| D325,505 | S | | 4/1992 | Hernandez | |
| 5,251,922 | A | * | 10/1993 | Mann | 280/47.29 |
| 5,288,090 | A | | 2/1994 | Bross | |
| 5,464,315 | A | * | 11/1995 | Palmer et al. | 414/458 |
| 5,507,509 | A | * | 4/1996 | Della Polla, Jr. | 280/79.7 |
| 5,702,561 | A | * | 12/1997 | Phillips | 156/580 |
| 5,899,650 | A | * | 5/1999 | Collins | 414/10 |
| 5,927,731 | A | | 7/1999 | Clarke | |
| 6,171,048 | B1 | * | 1/2001 | Grimes | 414/458 |
| 6,231,034 | B1 | * | 5/2001 | Walker et al. | 269/17 |
| 6,378,191 | B1 | | 4/2002 | County | |
| 6,505,844 | B2 | * | 1/2003 | Hallman et al. | 280/79.7 |
| 6,606,844 | B2 | | 8/2003 | Dillon et al. | |
| 6,832,870 | B1 | * | 12/2004 | Krivoy | 404/6 |
| 7,014,413 | B2 | | 3/2006 | Young | |
| 7,040,583 | B1 | * | 5/2006 | Holland et al. | 248/122.1 |
| 2002/0044853 | A1 | | 4/2002 | Keller | |
| 2002/0113390 | A1 | * | 8/2002 | Hallman et al. | 280/79.7 |

* cited by examiner

*Primary Examiner*—Hau V Phan
*Assistant Examiner*—Vaughn T Coolman
(74) *Attorney, Agent, or Firm*—Edward S. Sherman, Esq.

(57) ABSTRACT

A transport carriage for the installation and removal of doors, allows the door to be raised or lowered and aligned before removal from the device. The device is capable of installing standard and pre-hung doors at both the finish and sub-floor stage of construction.

8 Claims, 9 Drawing Sheets

DOOR CARRIER AND MOUNTING DEVICE

CROSS REFERENCE TO RELATED APPLICATIONS

None

BACKGROUND OF INVENTION

The present invention relates to a device and method that assist in the safe and accurate mounting of doors in door frames.

While others have recognized the need for improvements in the methods of transporting and mounting doors in door frames during construction, the prior art devices have not gained wide commercial application.

Carpenters still mount doors by hand, in part because of the need to properly align and level the door during installation. Carpenters and other workers are thus at risk to hand and back injury when installing heavy doors.

Further, as pre-hung doors become more common, such prior art devices are unsuitable for these purposes.

Accordingly, it is an object of the present invention to fulfill the on-going need for an improved door mounting device and method capable of rapid door installation, notably the ability to align and level the door, as well as the combination of a door and frame in a pre-hung door.

It is another object of the invention to provide a safer means for door installation, removal and replacement to minimize the risk of back and hand injuries.

It is still another object of the invention to provide a device with the aforementioned benefits that is suitable for situations with and without final floor in place, i.e. installation occurs on a sub flooring.

SUMMARY OF INVENTION

In the present invention, the first object is achieved by providing a door carrier and mounting device that comprises a support frame having a vertically extending lower portion and an upward extending portion central disposed and connected to the vertical portion to form an inverted T-shape, wherein the vertical and horizontal portions extend orthogonally from the inverted T-form, to a symmetrical three dimensional frame, wherein the vertical portion comprises a pair of upright members that are spaced apart to support a door there between, a plurality of three or more wheels, wherein at least two wheel of said plurality are disposed to extend downward on opposite sides of the horizontal portion of the frame, said wheels being spaced apart along the orthogonally extending portions thereof to define at least three points that support the frame in rolling engagement with a floor, an L shaped lift member attached to the frame and disposed to support a door disposed within the pair of upright members, said L-shaft lift member being capable of being raised or lower independent of the said wheels, in which one or more clamps attached to the frame stabilize the door resting on the horizontal portion of said L-shaped lift member.

A second aspect of the invention is characterized by a frame for transport and installing of doors and pre-hung doors that comprises a first L-shaped frame disposed in a first vertical reference plane, a second inverted L-shaped frame, wherein each L-shape frame extends in a second vertical reference plane that is orthogonal to the first vertical reference plane, a pair of wheel descending from horizontally extending portion of each of the first and second L-shaped frame portions, each pair of wheel being horizontally spaced in the direction of the second vertical reference plane, a U-shaped door supporting base having an upper portion joining the bottom of each of the first and second L-shaped frame, the door support base having a central and horizontally extending plate disposed below the top of the wheels, wherein a door resting on the horizontally extending plate is vertically supported by the upright portions of the first and second L-shaped frames disposed on opposite sides thereof.

The above and other objects, effects, features, and advantages of the present invention will become more apparent from the following description of the embodiments thereof taken in conjunction with the accompanying drawings.

DETAILED DESCRIPTION

Figure 1:
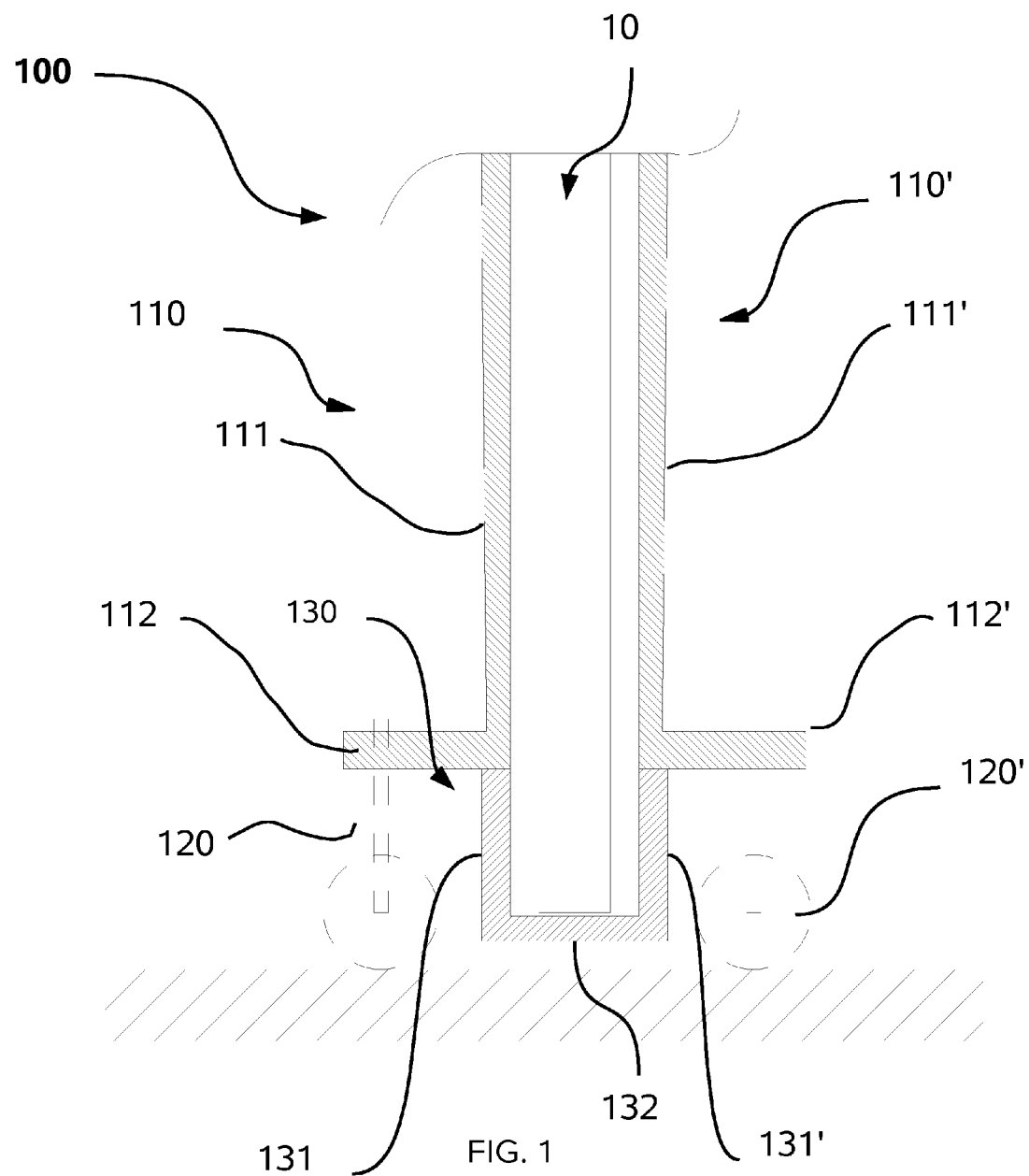
FIG. 1 is a first cross-sectional view of the lower portion of the device.

Referring to FIGS. 1 through 9, wherein like reference numerals refer to like components in the various views, there is illustrated therein a new and improved door carrier and mounting device generally denominated 100 herein.

In accordance with the present invention, FIG. 1 illustrates a partial view of a first embodiment of device 100 for transport and installing of door 10. Device 100 includes a first portion 110 that is generally L-shaped in this elevation view, and a second frame potion 110' that has a horizontally inverted L-shape disposed laterally off set from the first L-shaped portion 110', in that each L-shaped portion is the mirror image of the other. Each L shaped portion of the frame of device 100 has a vertically extending member 111 and a horizontally extending member 112. Preferably, two or more wheels 120 descend from horizontally extending member 112. The two wheels 120 and 120' associated with each L shaped member are horizontally spaced apart, as shown in the orthogonal view in FIG. 2. The door 10 is disposed within the U-shaped door supporting base 130, which has the upper vertical portions 131 and 131' joining the bottom of each of the first and second L-shaped frame 110 and 110' respectively. The door support base 130 also has a central and horizontally extending plate 132 disposed below the top of the wheels 120, connecting the lower vertical portions 131 and 131'. The position of horizontally extending plate 132 below the wheel supporting horizontally extending member 112, and more significantly so that it is central of the wheels 120 permits the bottom of door 10 to be brought to its final position just clearing the bottom of the finish flooring.

It should be understood that the frame may be solid or merely a combination of elongated members connected together, as well as combination thereof to obtain the desired combination of weight and stiffness suitable for doors of particular size and weight. It should be noted that FIG. 2 illustrates one non-limiting embodiment of how the frame members may extend in the orthogonal direction, as it shows the L shaped frame 110 as a rectangular frame 110, while U shaped door supporting base is the shape of an inverted "T".

Figure 6:
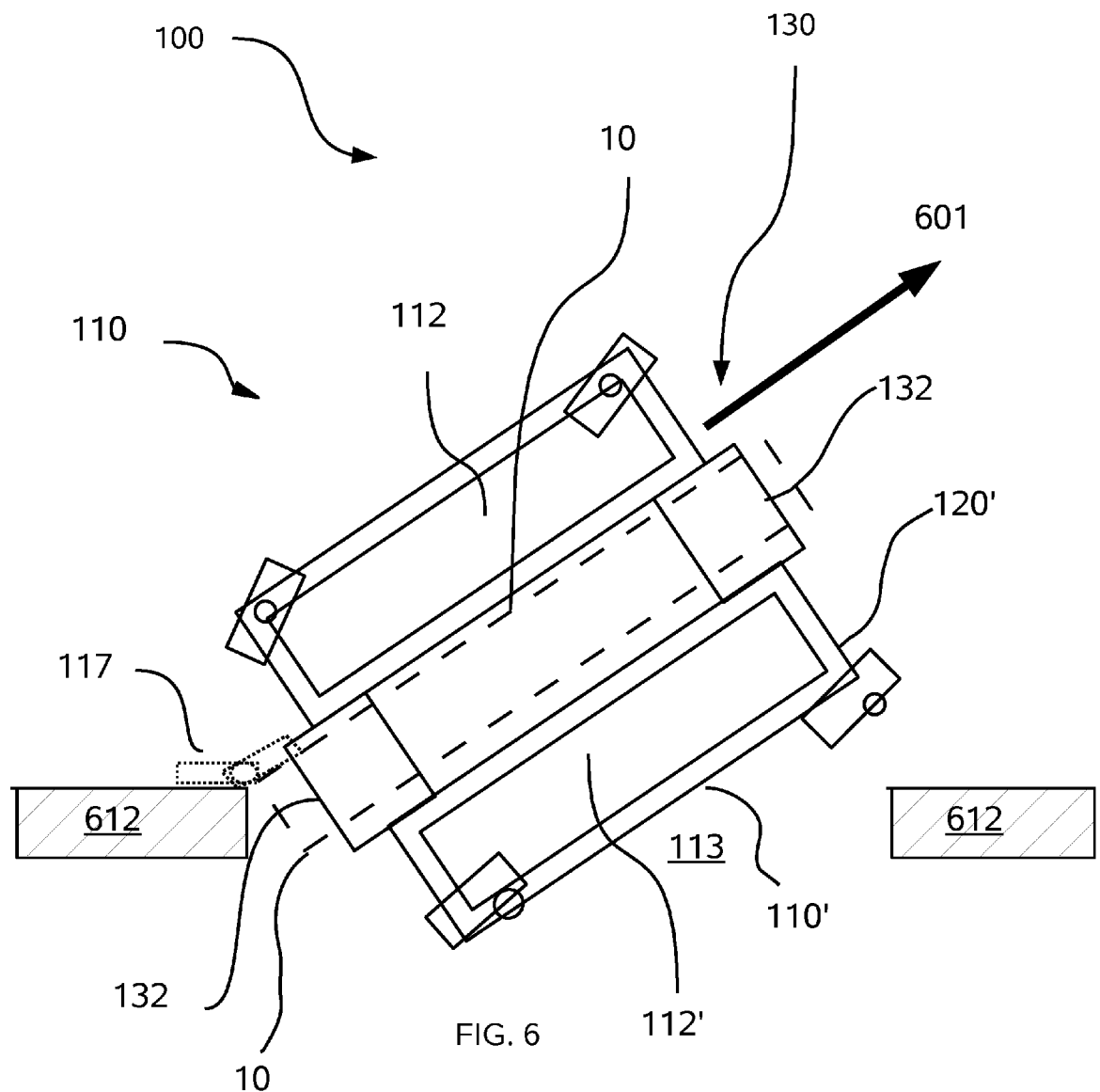
FIG. 6 is a plan view of the door being installed in a doorway using the device of FIG. 5.

The horizontal portion of the L-shaped frames 110 and 110' position each of the wheel pairs 120 and 120' away from the door to provide stability, but at a narrower spacing than the door so that the entire apparatus can be rolled into a door frame, as shown in the plan view in FIG. 6.

It should be noted that the door 10, having its bottom side resting on the horizontally extending plate 130 can be vertically supported by the upright portions of the first and second L-shaped frames 110 and 110' disposed on opposite sides thereof, as will be explained further with respect to the embodiments of FIG. 5 et seq.

Figure 2:
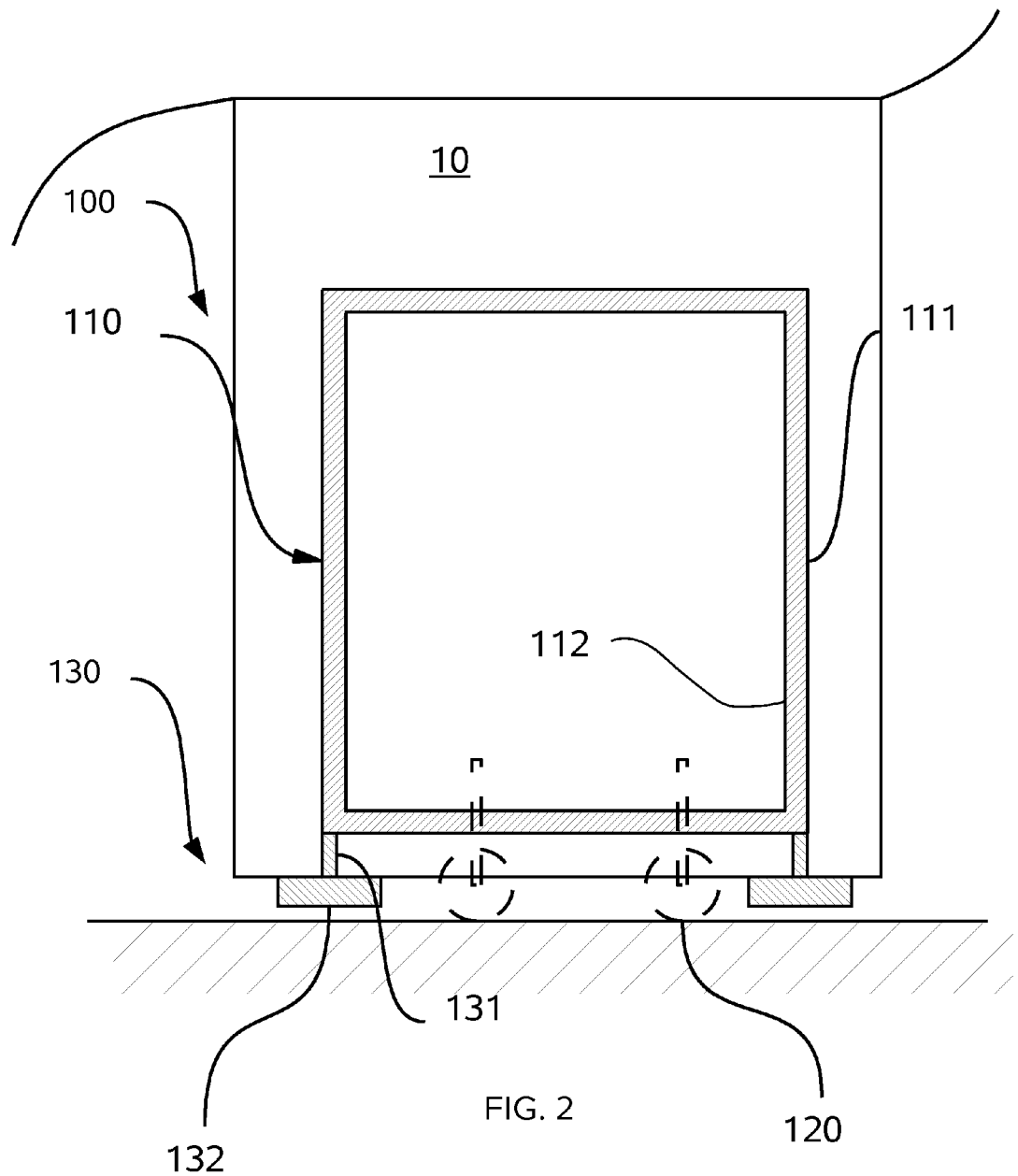
FIG. 2 is another cross-sectional view of the device, but orthogonal to the view shown in FIG. 1.
Figure 3:
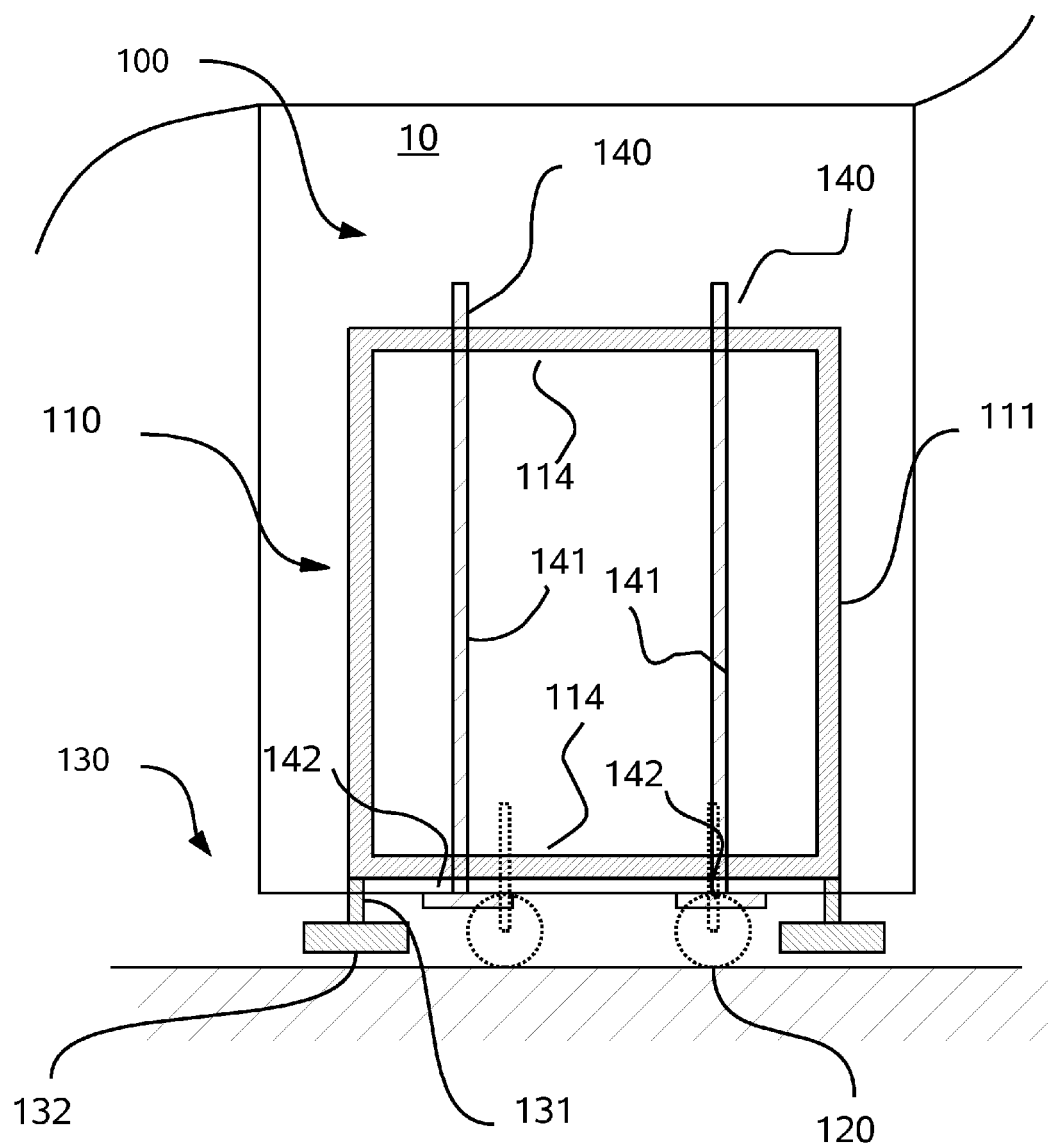
FIG. 3 illustrates another embodiment of the device, shown in the same orthogonal view as FIG. 2 with the door positioned higher relative to the device in FIG. 1-2.

FIG. 3 illustrates another embodiment where a lift 140 is disposed between the forward and rear U-shaped supporting bases shown in FIG. 1-3.

The generally L-shaped lift 140 has a pair of horizontal feet 142 disposed between the two pairs of horizontally extending plates 132 on opposite side of the of the door support base 130. These two pairs of horizontally extending plates 132 on opposite side of the of the door support base 130 together with the opposing and attached vertically extending members 11 provide a pair of upward facing U shaped channels. Each U-shaped channel has an upper planar bottom in the center thereof and is further characterized by a primary axis running along the center of the upper planar bottom. The pair of U-shaped channels are aligned and separated by a gap such that the primary axis of each U-shaped channel is coincident with a the primary axis of the other U-shaped channel, the gap being in the direction of the coincident primary axes thereof. Thus, the bottom of a door 10 is supported by the upper planar bottoms of the U-shaped channels so as to be positioned above the ground with the bottom thereof substantially parallel to the ground surface so the planar front and rear surface of the door is disposed in a first vertical plane extending upward from the upper planar bottom of the pair of U-shaped channels. The horizontal feet 142 support the bottom edge of door 10 so that it can be lifted higher than the position shown in FIGS. 1 and 2 where it rests on the horizontally extending plate 132. A pair of vertical posts 141 are connected to the side of each of the horizontal feet 142 to form a portion of a lifting frame. The vertical posts 141 are also threaded and extend through a hollow vertical shaft 148 having a top end 148a that supports a terminal nut 145. The hollow vertical shafts are attached to the upper and lower vertical portions 114 of frame 110. The pair of vertical posts 141 are thus in vertically adjustable engagement with the L-shaped frame 110 or 110' and extend through the upper and lower vertical portions 114 of frame 110. More specifically the terminal nut 145 is threaded onto the verticals posts 141, such that the rotation of the terminal nut 145 on each post 141 raises or lowers the vertical posts 141 within the hollow vertical shaft 148 to raise or lower the horizontal feet 142, thus adjusting the position of the bottom of the door above the supporting horizontally extending plate 132.

Further, via terminal nut 145 the user can independently adjustment of right and left portions of the L-shaped lift 140 to level the door, as may be require when the subfloor is uneven, rough or when the bottom of the door is not square with respect to the sides.

In addition, it is also preferable that lift 140 also include lift handles 144 which extend laterally from vertical posts 141 so that the door 10 can be rapidly moved upward.

It should be appreciated that the adjustable height of the pair of horizontal feet 142 above the horizontally extending plate 132 permits the bottom of door 10 to be brought to its final position with respect to not yet installed finish flooring, when the device 100 is resting on a sub-floor. However, the presence of lift 140 by no means diminishes the ability to install a door 10 over finish flooring, but rather provides an additional range of height adjustment and control.

Figure 4:
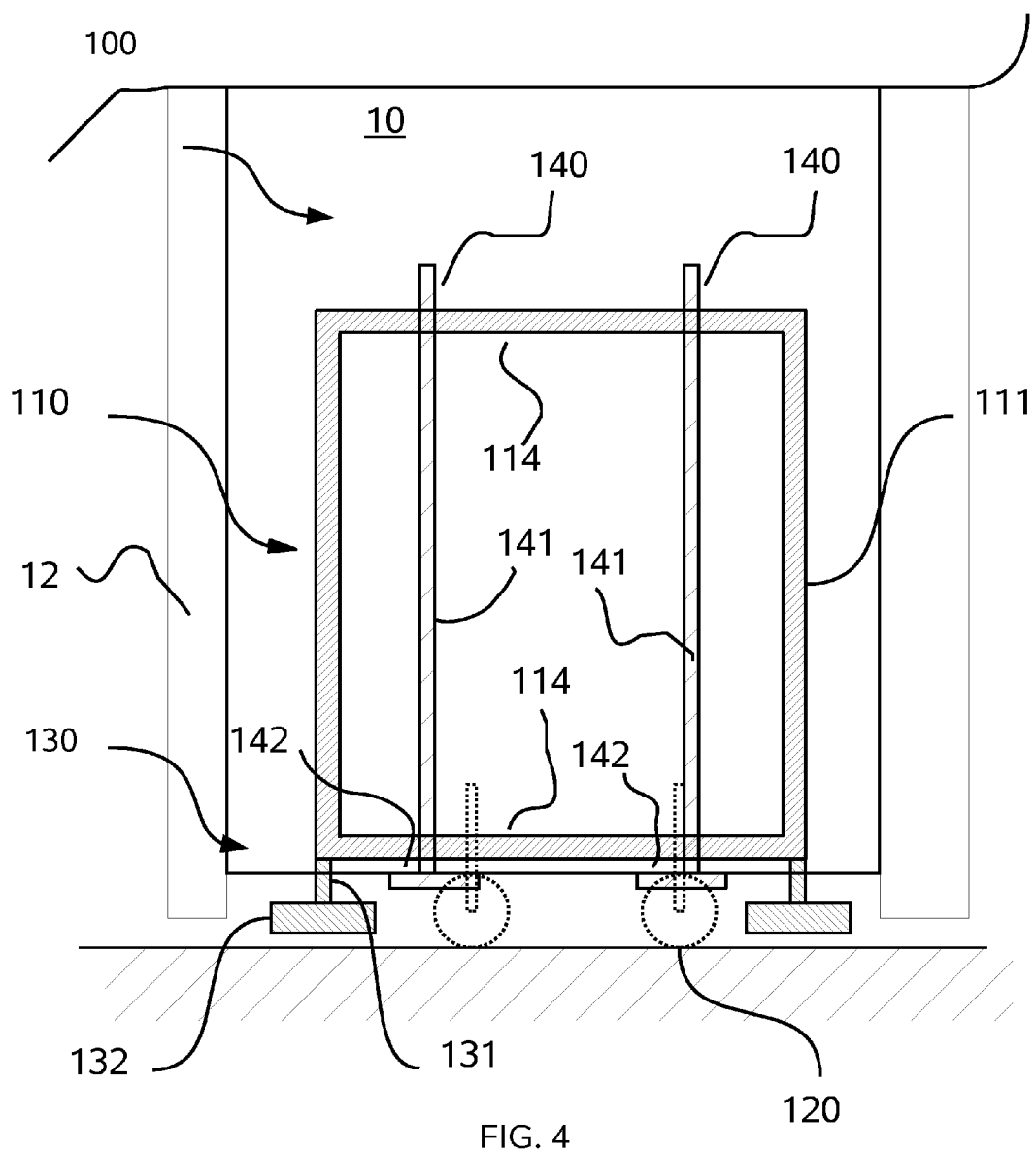
FIG. 4 illustrates another embodiment of the device, shown in the same orthogonal view as FIG. 2 with a pre-framed door positioned higher relative to the device in FIG. 1-2.

In the alternative configuration of the device of FIG. 3, now shown in FIG. 4.

A pre-framed door 10, with exterior frame 12 attached is installed. In this instance, the door portion 10 rests on horizontal feet 142 so that so that the bottom of door frame 12 can be lowered so that it is eventually supported by the floor. It should be noted that it is preferable that the horizontally extending plate 132 be close to the floor so that the frame 12 can reach the floor without interference there from.

Figure 5:
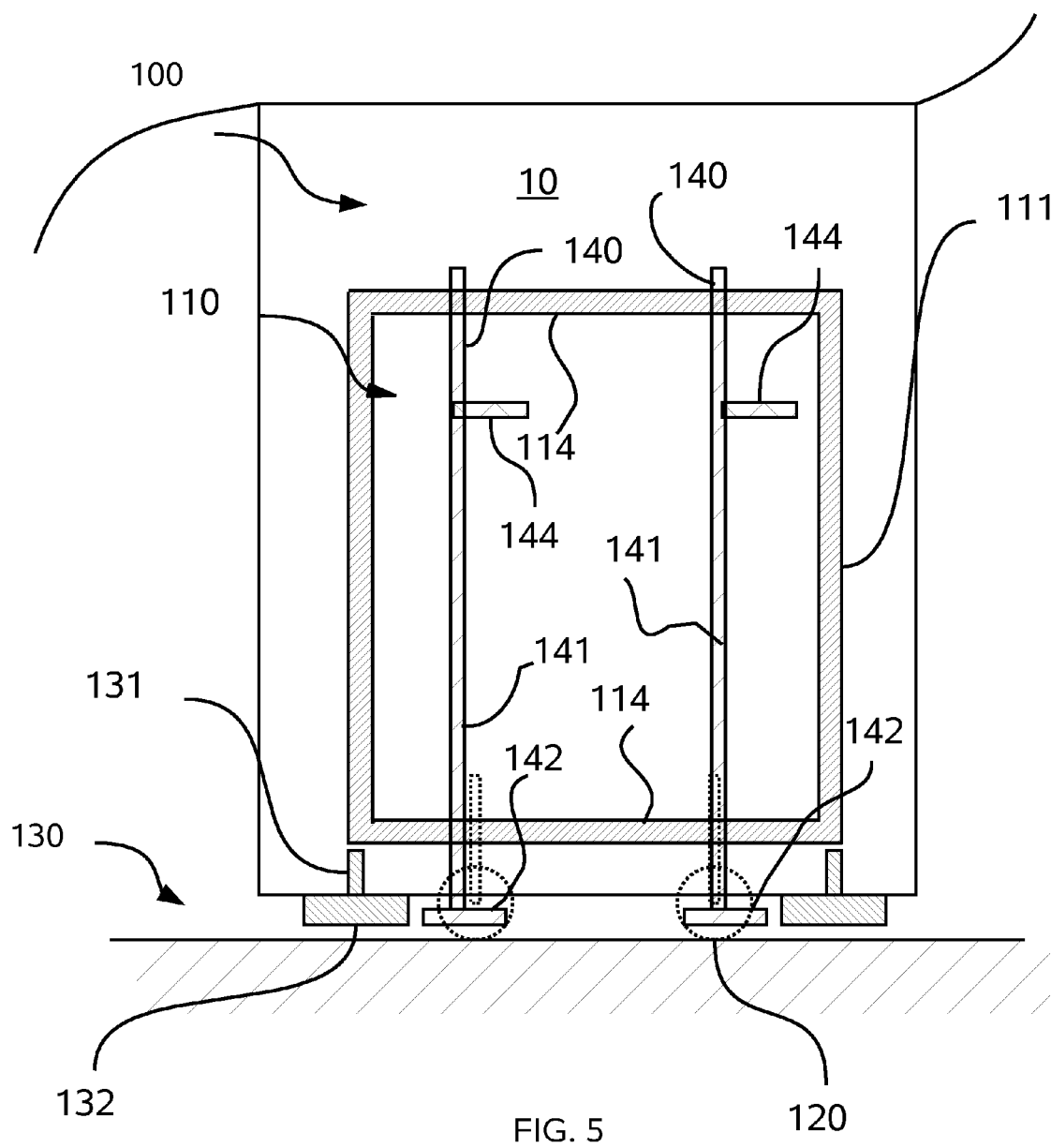
FIG. 5 illustrates another configuration of the device of FIG. 3 wherein the doors is positioned lower.

In FIG. 5, the door 10 shown in FIG. 3 has been lowered to the correct height for installation, as well as leveled by lift 140. In the preferred embodiments shown in FIG. 7-9, further detail of lift 140, clamps 160 and wheel 120 are illustrated.

FIG. 6 also shows device 100 in a plan view as used to install door 10 into an open doorway 113, surrounded by frame 612 It should be noted that the device 100 allowed the door 10 to be aligned from the side at an oblique angle with respect to the door frame to align and attach hinge 117 to the door 10 and frame 112. Further, once the door 10 is installed, the clamps 160 are loosened and the device 100 is removed in the direction shown by arrow 60. It should be appreciated that the width of the device 100, in the direction of the elevation in FIG. 1, should be narrower than the typical doorway opening so that the door can be transported through opening 113 from either side.

Figure 7:
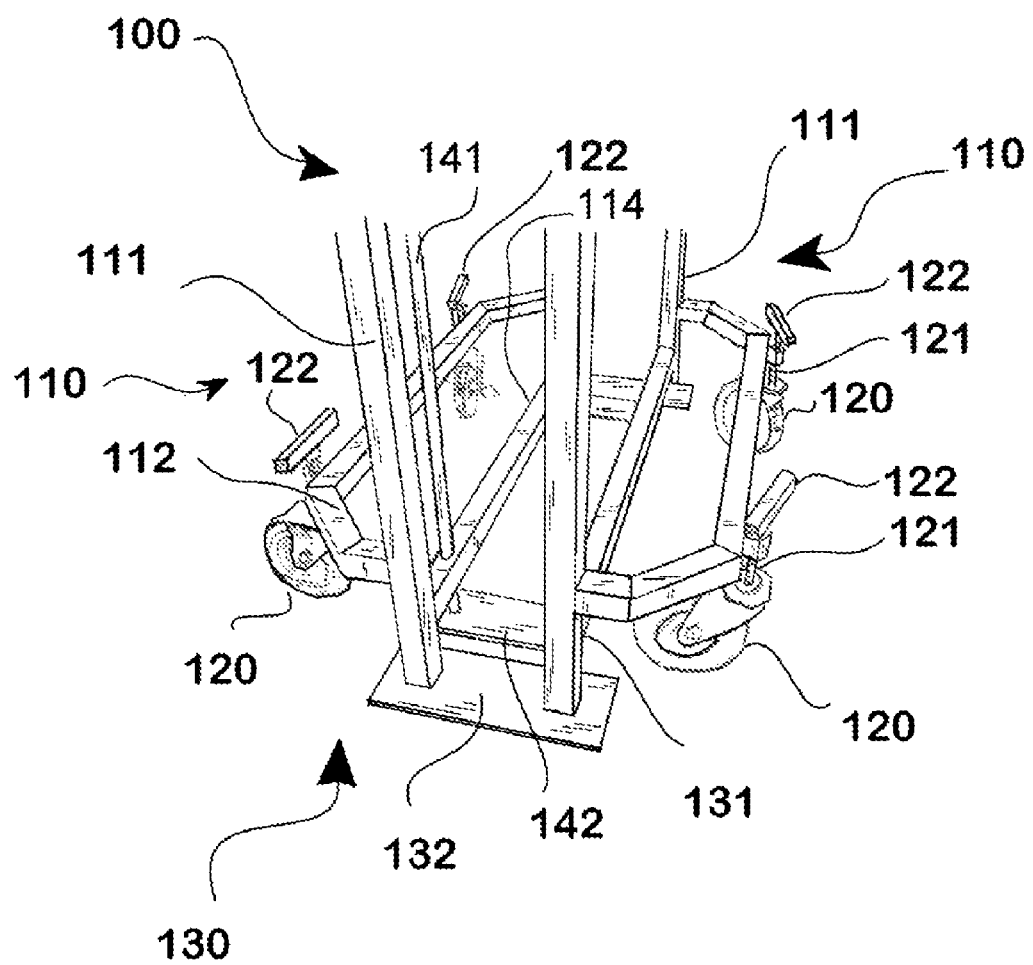
FIG. 7 is a partial perspective view of a more preferred embodiment of the device.
Figure 8:
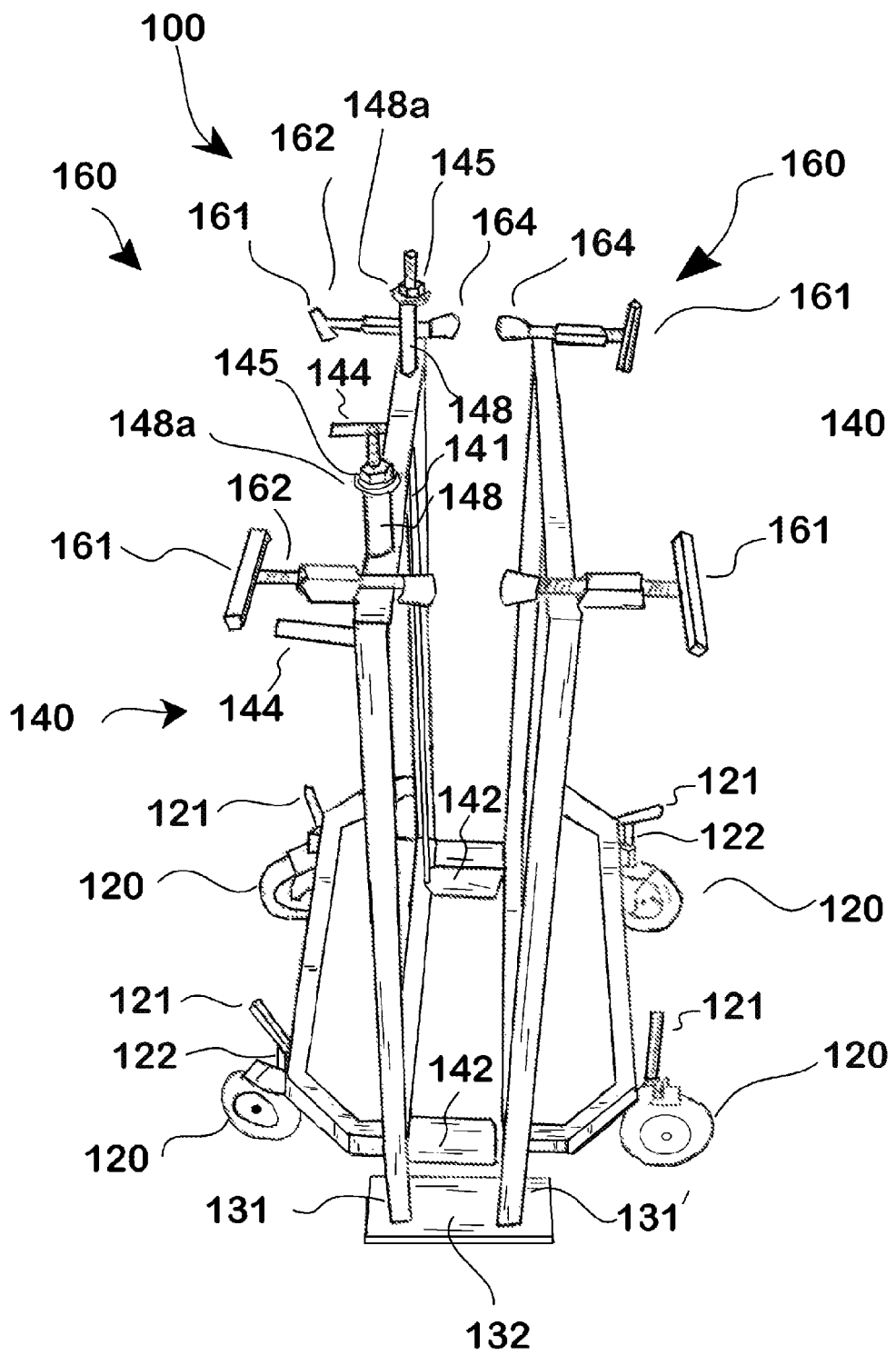
FIG. 8 is a full perspective view of the device of FIG. 7

FIG. 7 is a partial perspective view of another embodiment showing more preferred aspects and features of the invention, of which the entire device is illustrated in FIG. 8.

Figure 9:
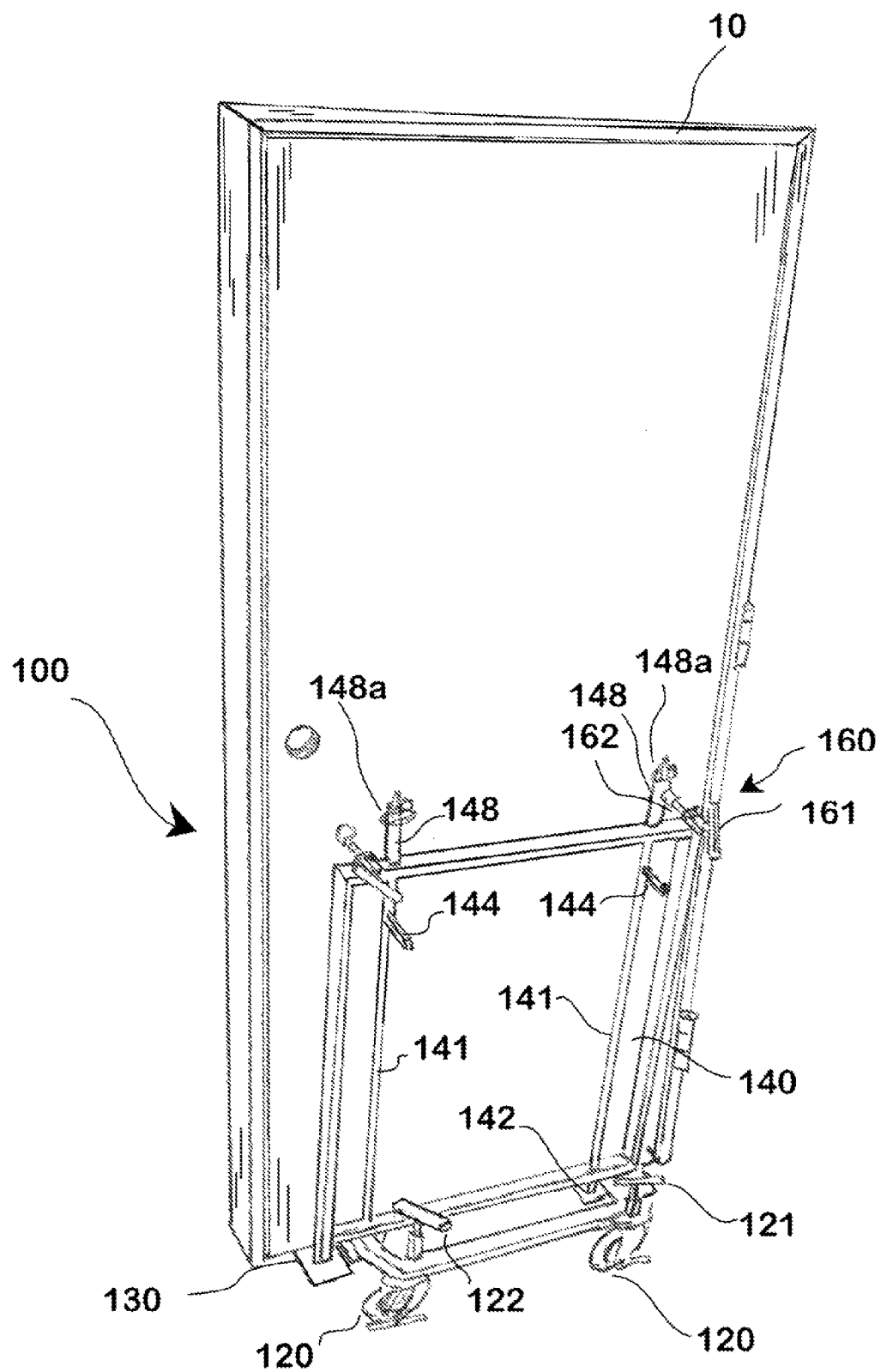
FIG. 9 is a full perspective view of a door being transported in the device of FIGS. 7 and 8.

FIG. 9 is a perspective view of the preferred embodiment of FIGS. 7 and 8 in which a door is being transported for installation. These figures further illustrates a preferred application of a clamp mechanism 160 in which pairs of opposing clamp tips 164 are brought into contact with opposite sides of the door by turning clamp handles 161. As the clamp tips 164 and clamp handles 161 are at opposite ends of each of the clamp shafts 162 that are in threaded engagement with a portion of the frame, the handles are rotated to clamp and unclamp door 10 for transport and after installation respectively. To the extent that the bottom edge of the door 10 is uneven, rough or not square with the vertical sides of door 10 this can be corrected by the adjustment of the clamps 160.

Further, each of the rollers 120 is preferably independently raised or lower by rotating handle 121, which rotates the shaft 122 connected to the wheel which is in threaded engagement with the horizontally extending member 112. In addition, it is preferable that each of the wheels 120 is set in a castor that allows 360 degrees of rotation to facilitate transport and removal of the device 100 after the door 10 is installed.

Further, it should be apparent that alternative embodiment of the invention may deploy as few as three wheels or castors. However in such case it is preferable that the wheels be spaced apart in a stable configuration. While this can be accomplished by placing one wheel between the L-shaped members, this is less desirable as it may limit the lowest position of horizontally extending plate 132 for supporting door 10. However, it may also be possible to utilize one or more wheel close to or just straddling the horizontally extending plate 132 at one end, with the other two wheels spaced further apart at the other end to create essentially three or four stable points for resting the device 100 in rolling engagement with the floor. It is also preferable that at least one or more of the plurality of wheels be lockable.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A door carrier and mounting device, comprising:
   a) a first frame for supporting a door comprising;
      i) a base having a pair of upward facing U-shaped channels, each U-shaped channel having an upper planar bottom in the center thereof and being further characterized by a primary axis running along the center of the upper planar bottom, wherein said pair of U-shaped channels are aligned such that the primary axis of each U-shaped channel is coincident with a the primary axis of the other U-shaped channel, with the U-shaped channels being separated by a gap along the primary coincident axes thereof, wherein a lower portion of a door is supportable by the upper planar bottoms of the U-shaped channels,
      ii) a plurality of arms attached to and extending laterally outward from opposing sides of said base;
      iii) a plurality of support members attached to said plurality of arms and extending upwardly substantially parallel to one another; and
      iv) a plurality of wheels adjustably attached to said plurality of arms disposed distal from a central axis of said base
   b) a lifting frame having a pair of spaced apart lifting feet capable of being raised from below to above the coincident primary axes of the U-shaped channels, wherein the lifting frame is coupled in vertically adjustable engagement with said first frame for raising a bottom of a door above the upper planar bottom of the U-shaped channels.

2. A door carrier and mounting device according to claim 1 wherein each of the spaced apart lifting feet can be raised and lowered independent of the other lifting foot.

3. A door carrier and mounting device according to claim 2 wherein each of the spaced apart lifting feet is raised by a vertically disposed threaded rod attached to an end thereof.

4. A door carrier and mounting device according to claim 3 wherein each of vertical disposed threaded rods extends through a hollow vertical shaft having a top end, each hollow vertical shaft being attached to the door supporting frame, with the threaded rod coupled in vertically adjustable engagement with said door supporting frame by a nut, said nut being supported by the top end of the hollow vertical shaft.

5. A door carrier and mounting device according to claim 4 and further comprising one or more clamps coupled to the door supporting frame to stabilize a door resting on the horizontal portion of said L-shaped lift member.

6. A door carrier and mounting device according to claim 5 wherein each of the spaced apart lifting feet can be raised and lowered independent of the other lifting foot.

7. A door carrier and mounting device according to claim 1 wherein the spaced apart lifting feet are elongated and have a principal axis disposed perpendicular to the primary axis of each U-shaped channel.

8. A door carrier and mounting device according to claim 1 and further comprising one or more clamps coupled to the door supporting frame to stabilize a door resting on the horizontal portion of said L-shaped lift member.

* * * * *